Oct. 2, 1928.
M. RACHLIN
SHEET METAL PIPE COUPLING
Filed Jan. 19, 1927  2 Sheets-Sheet 1
1,686,254
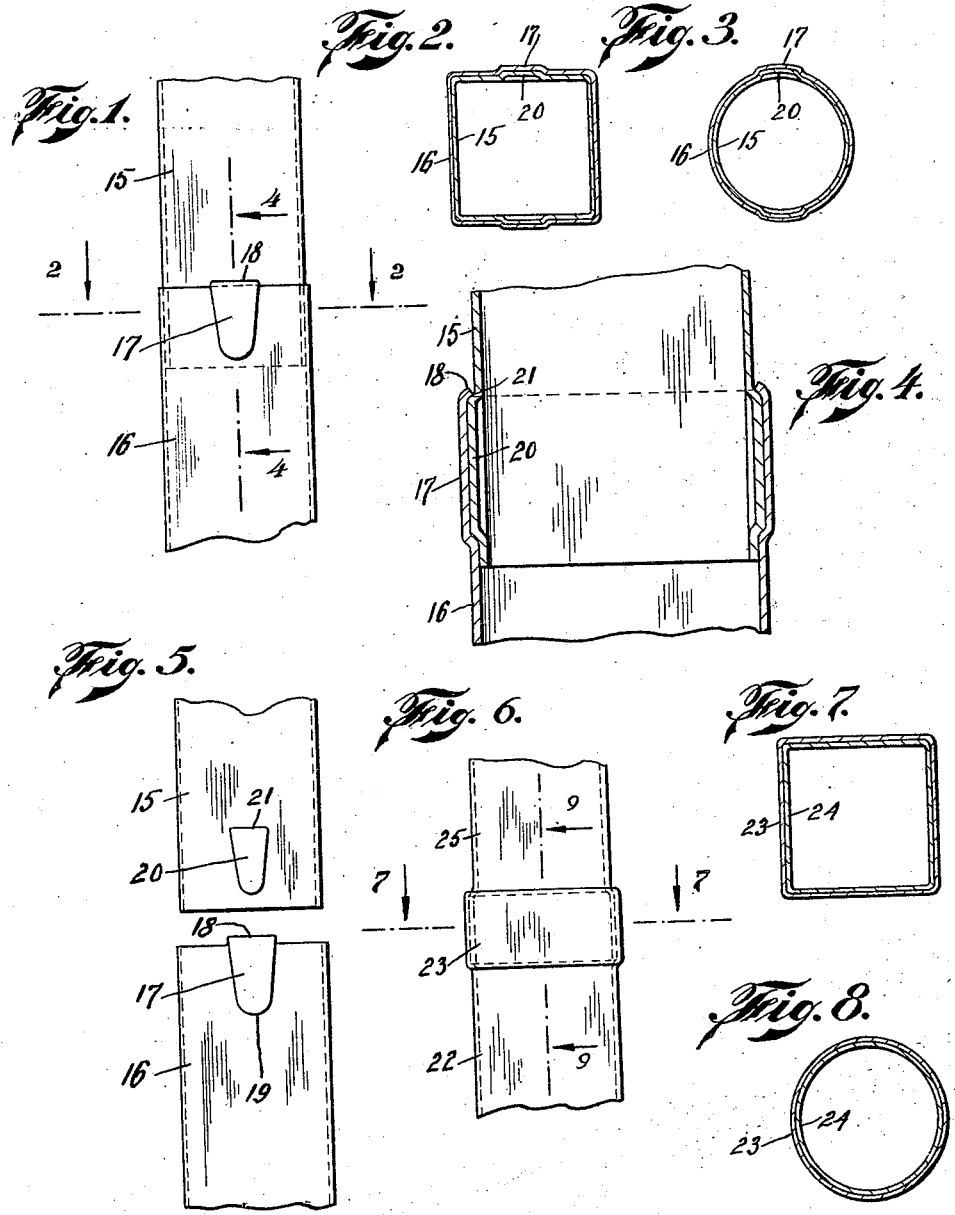
INVENTOR
Max Rachlin
BY
Sigmund Herzog
ATTORNEY

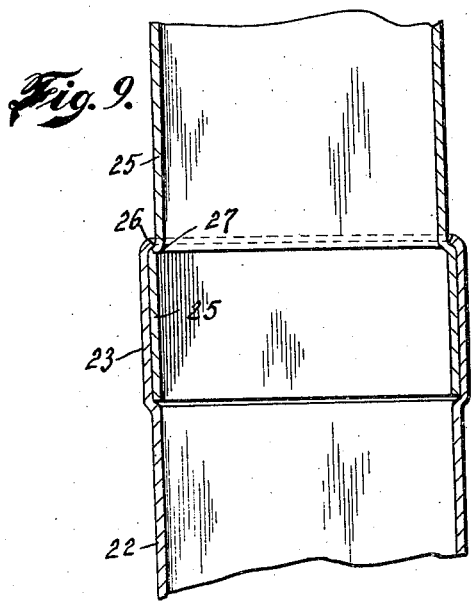
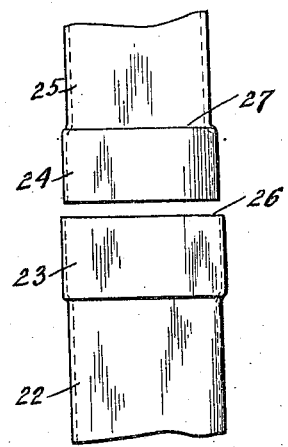
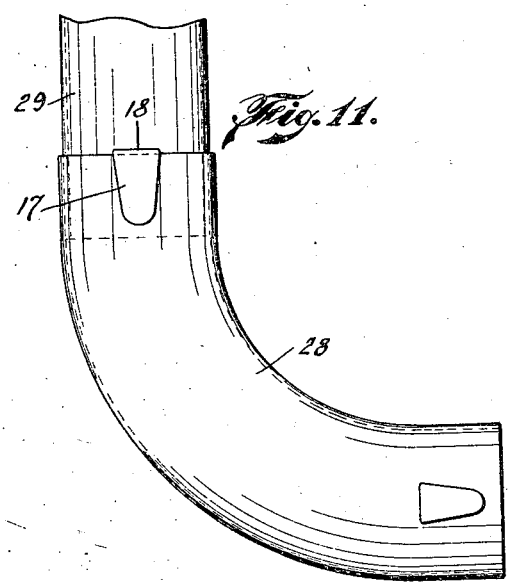
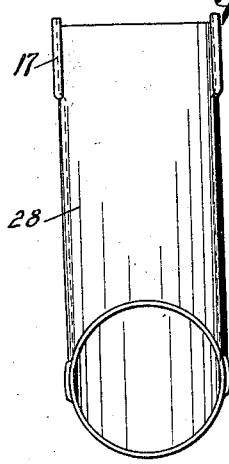

Patented Oct. 2, 1928.

1,686,254

UNITED STATES PATENT OFFICE.

MAX RACHLIN, OF BROOKLYN, NEW YORK.

SHEET-METAL PIPE COUPLING.

Application filed January 19, 1927. Serial No. 162,056.

The present invention relates to means for joining or coupling the ends of sheet-metal pipe sections, such as, for instance, the downspouts of eaves-troughs, stove pipes and the like.

The main object of the invention is to provide a coupling for sheet-metal pipes, wherein the elements of the coupling are made integral with the pipe sections to be united, means being provided for conveniently and efficiently interlocking the pipe sections.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

A few of the many possible embodiments of the invention are illustrated in the accompanying drawings, in which:—

Figure 1 is an elevation of two pipe sections joined by the improved coupling; Fig. 2 is a section taken on line 2—2 of Fig. 1; Fig. 3 is a similar section taken through pipe sections of the circular cross-section; Fig. 4 is a section taken on line 4—4 of Fig. 1, on a larger scale; Fig. 5 is an elevation of the two pipe sections and the coupling elements before being assembled; Fig. 6 is an elevation of a modified coupling; Fig. 7 is a section taken on line 7—7 of Fig. 6; Fig. 8 is a section similar to the one shown in Fig. 7 of a coupling used in connection with pipe sections of circular transverse cross-section; Fig. 9 is a section taken on line 9—9 of Fig. 6, on a larger scale; Fig. 10 is an elevation of the pipe joint illustrated in Figs. 6, 7 and 9, before assembling; Fig. 11 is an elevation of a pipe and elbow coupling; and Fig. 12 is a side elevation of the coupling shown in Fig. 11, before being assembled.

Referring now first to Figs. 1 to 5, inclusive, of the drawings, the numerals 15 and 16 indicate two sheet-metal pipe sections of any suitable transverse cross-section. As will appear from the following specification, the invention is applicable to sheet-metal pipe sections in general, irrespective of the configuration of their transverse cross-sections. In Fig. 2, for instance, the pipe sections are shown as having quadrangular cross-sections and in Fig. 3 as having circular cross-sections. The invention is, however, applicable to other cross-sections just as well. It is applicable also to corrugated pipe sections. The section 15 is adapted to be inserted into the section 16, and the latter is provided at its end, which receives the section 15, with a plurality of sockets 17, which extend longitudinally on the pipe section 16 and are made integral with the last-named pipe section. These sockets are obtained, preferably, by stamping operation. They are substantially wedge-shaped, as clearly appears from Figs. 1 and 5 of the drawings, their upper ends 18 being substantially wider than their lower ends 19. That end of the section 15, which is adapted to be inserted into the section 16, is provided adjacent its insertable end with a plurality of lugs 20, corresponding in number to that of the sockets 17. The configuration of the lugs corresponds to that of the said sockets, and their size being such that they are adapted to be inserted into said sockets.

For the purpose of joining the pipe sections 15 and 16, the lugs of the former are brought into alignment with the sockets of the pipe section 16, as shown in Fig. 5 of the drawings, and the pipe section 15 inserted into the pipe section 16, so that the lugs 20 are seated in the sockets 17. After this, the edges 18 of the sockets 17 are swedged over the upper edges 21 of the lugs 20, whereby the two pipe sections are firmly united.

The lugs 20 are made integral with the pipe section 15, they being formed, preferably, by stamping.

From the foregoing it appears that the elements of the pipe coupling are made integral with the pipe sections to be united, and that they prevent disengagement of said pipe sections.

The modification illustrated in Figs. 6 to 10, inclusive, differs from the one above described in that one of the pipe sections is provided with a socket extending all around its end to be joined, and the other section is provided with a lug also extending all around the end to be joined. More specifically, the pipe section 22 has an enlarged end 23, constituting a socket, into which the enlarged end 24 of the pipe section 25 is adapted to be inserted. After insertion, the upper edge 26 of the socket 23 is swedged over the upper edge 27 of the enlarged end 24 of the pipe section 25, whereby the said two pipe sections are prevented from disengagement. The difference between the two constructions hereinabove described consists in that, while in the construction illustrated in Figs. 1 to 5, inclusive, relative rotary movement between the two pipe sections is prevented, such relative rotary motion is possible in the constructions illustrated in Figs. 6 to 10, inclusive, of the drawings, unless the friction between the two pipe sections be great enough to prevent such movement.

The construction illustrated in Figs. 11 and 12 of the drawings differs from the one described in connection with Figs. 1 to 5, inclusive, only in that an elbow 28 is joined with a pipe section 29, one of said elements being provided with sockets 17 of the type above described and the other one with lugs 20. Otherwise the construction and operation of the elements are the same.

By the term "pipe section", as used in the claim, is meant a straight pipe section or a curved pipe section, such as an elbow, or other like fitting, it being obvious that the joint may be used for connecting straight pipe sections, curved pipe sections or straight and curved pipe sections.

What I claim is:

A sheet-metal pipe section provided with a plurality of longitudinally extending substantially wedge-shaped sockets in one of its ends, said sockets being wider at their outer ends than at their inner ends, a second sheet-metal pipe section having one of its ends inserted into the socketed end of said first-mentioned pipe section, and a plurality of wedge-shaped lugs on the inserted end of said second-mentioned pipe section corresponding in number to and being seated in said sockets, the free outer wider ends of said sockets being swedged over the inner ends of said lugs.

Signed at New York, in the county of New York and State of New York, this 18th day of January, A. D. 1927.

MAX RACHLIN.